(12) United States Patent
Koshak et al.

(10) Patent No.: US 11,415,977 B2
(45) Date of Patent: Aug. 16, 2022

(54) MAINTENANCE CONTROL PROGRAM

(71) Applicant: eMCP, LLC, Collierville, TN (US)

(72) Inventors: John W. Koshak, Collierville, TN (US); Daniel C. Swett, Houston, TX (US); Kenneth J. Smith, Preston, IA (US)

(73) Assignee: eMCP, LLC, Collierville, TN (US)

( * ) Notice: Subject to any disclaimer, the term of this patent is extended or adjusted under 35 U.S.C. 154(b) by 602 days.

(21) Appl. No.: 16/342,578

(22) PCT Filed: Oct. 27, 2017

(86) PCT No.: PCT/US2017/058673
§ 371 (c)(1),
(2) Date: Apr. 17, 2019

(87) PCT Pub. No.: WO2018/081507
PCT Pub. Date: May 3, 2018

(65) Prior Publication Data
US 2020/0057434 A1 Feb. 20, 2020

Related U.S. Application Data

(60) Provisional application No. 62/413,595, filed on Oct. 27, 2016.

(51) Int. Cl.
*G05B 23/02* (2006.01)
*G05B 19/05* (2006.01)

(52) U.S. Cl.
CPC ....... *G05B 23/0283* (2013.01); *G05B 19/058* (2013.01); *G05B 23/0227* (2013.01); *G05B 2219/24001* (2013.01)

(58) Field of Classification Search
CPC ............ G05B 23/0283; G05B 23/0227; G05B 19/058; G05B 2219/24001; G05B 2219/32234
See application file for complete search history.

(56) References Cited

U.S. PATENT DOCUMENTS

2012/0290104 A1* 11/2012 Holt ................. G06Q 10/00
700/29
2013/0253974 A1* 9/2013 Mangalam ....... G06Q 10/06315
705/7.25

(Continued)

*Primary Examiner* — Manuel L Barbee
(74) *Attorney, Agent, or Firm* — C. Fred Charpie, III; Ward Law Office LLC

(57) ABSTRACT

A maintenance control program for use in maintaining mechanical and electro-mechanical equipment is provided. The maintenance control program includes a completed survey of the mechanical and electro-mechanical equipment. The completed survey is configured to document the physical characteristics of the mechanical and electro-mechanical equipment and an assessment of a plurality of metrics concerning the mechanical and electro-mechanical equipment. An algorithm is configured to apply values to the assessment of the plurality of metrics. A schedule of code required maintenance tasks is developed for the mechanical and electro-mechanical equipment, wherein an interval of the required maintenance tasks is determined by the algorithm based on the values applied to the assessment of the plurality of metrics.

20 Claims, 22 Drawing Sheets

(56) References Cited

U.S. PATENT DOCUMENTS

2016/0012707 A1* 1/2016 McKinley ............ G08B 21/187
　　　　　　　　　　　　　　　　　　　　340/679
2016/0134686 A1* 5/2016 Youker .................... B66B 1/34
　　　　　　　　　　　　　　　　　　　　709/217

* cited by examiner

Electric Geared Elevator Survey

Finalize

_24_

> Physical Survey – Equipment Age Metric:
>
> - Less than 1 year old = 1
>
> - 1 year to 5 years old = 2
>
> - 6 years to 10 years old = 3
>
> - 11 years to 15 years old = 4
>
> - 16 years to 20 years old = 5
>
> - 21 years to 30 years old = 6
>
> - Over 30 old = 7

Physical Survey – Condition Metric:

- Mint = 1

- Very Good = 2

- Good = 3

- Fair = 4

- Bad = 5

- Very Bad = 6

- Worst = 7

Physical Survey – Accumulated Wear Metric:

- No Wear = 1
- Slight = 2
- Noticeable = 3
- Very Evident = 4
- Worn = 5
- Very Worn = 6
- Replace = 7

Physical Survey – Design Metric:

- Best = 1
- Great = 2
- Good = 3
- Fair = 4
- Just Ok = 5
- Poor = 6
- Worst = 7

Physical Survey – Inherent Quality Metric:

- Highest = 1

- Great = 2

- Good = 3

- Fair = 4

- Just Ok = 5

- Poor = 6

- Lowest = 7

*Fig. 7*

_Physical Survey – Usage Metric:_

- ADA/Minimal = 1

- Small Apartment/Condo = 2

- Large Apartment/Condo = 3

- Office Having less than 20 floors = 4

- Office Having more than 20 floors = 5

- Observation/very busy = 6

- Medical/Convalescent = 7

Physical Survey – Environment Metric:

- Very Clean = 1

- Mostly Clean = 2

- Dusty = 3

- Grimy = 4

- Dirty = 5

- Very Dirty = 6

- Filthy = 7

Physical Survey – Technology Metric:

- Computer = 1
- TTL/DTL = 2
- Ice Cube Relay = 3
- Open Relay = 4
- Carbon Relay = 5
- Phenolic Board = 6
- Slate Board = 7

*Fig. 10*

Equipment Unit # AABBCCDD
Global Interval Summation

| Metric | Value |
|---|---|
| Age | 2 |
| Condition | 4 |
| Accumulated Wear | 3 |
| Design | 1 |
| Inherent Quality | 2 |
| Usage | 5 |
| Environment | 6 |
| Technology | 3 |
| Sum | 26 |

*Fig. 12*

Equipment Unit # AABBCCDD
Global Maintenance Interval

| Metric Summation | Maintenance Interval |
|---|---|
| Less than 20 | Every 12 Months |
| 20 to 28 | Every 9 Months |
| 28 to 35 | Every 6 Months |
| 35 to 42 | Every 4 Months |
| 42 to 49 | Every 3 Months |
| 49 to 56 | Every 2 Months |
| Over 56 | Monthly |

*Fig. 13*

Type of Unit
Direct Hydraulic Elevator
Unit Serial No.
EE3763
Unit AHJ Number/Local Unit No
1

Maintenance Records

| | Jul 2016 | Aug 2016 | Sep 2016 | Oct 2016 | Nov 2016 | Dec 2016 | Jan 2017 | Feb 2017 | Mar 2017 | Apr 2017 | May 2017 | Jun 2017 |
|---|---|---|---|---|---|---|---|---|---|---|---|---|
| 8.6.4.13.1(a) Egress Landings – Door Locks | 5 Min. | 5 Min. | 5 Min. | 5 Min. | 5 Min. | 5 Min. | 5 Min. | 5 Min. | 5 Min. | 5 Min. | 5 Min. | 5 Min. |
| 8.6.4.13.1(b) Gate Switch or Car Door Interlock | 5 Min. | 5 Min. | 5 Min. | 5 Min. | 5 Min. | 5 Min. | 5 Min. | 5 Min. | 5 Min. | 5 Min. | 5 Min. | 5 Min. |
| 8.6.4.13.1(f) Egress Landings – Top of Hoistway Door | 4 Min. | 4 Min. | 4 Min. | 4 Min. | 4 Min. | 4 Min. | 4 Min. | 4 Min. | 4 Min. | 4 Min. | 4 Min. | 4 Min. |
| 8.6.4.13.1(f) Non-Egress Landings – Top of Hoistway Door | | | 4 Min. | | | | | | | | | |
| 8.6.4.13.1(h) Non-Egress Landings – Bottom of Hoistway Door | | | 4 Min. | | | | | | | | | |
| 8.6.4.13.1(h) Egress Landings – Bottom of Hoistway Door | 4 Min. | 4 Min. | 4 Min. | 4 Min. | 4 Min. | 4 Min. | 4 Min. | 4 Min. | 4 Min. | 4 Min. | 4 Min. | 4 Min. |
| 8.6.4.13.1(i) Car Door Clutch | | | | 10 Min. | | | | | | 10 Min. | | |
| 8.6.4.13.1(j) Non-Egress Landings – Relating Means | | | 4 Min. | | | | | | | | | |
| 8.6.4.13.1(h) Egress Landings – Relating Means | 1 Min. | 1 Min. | 1 Min. | 1 Min. | 1 Min. | 1 Min. | 1 Min. | 1 Min. | 1 Min. | 1 Min. | 1 Min. | 1 Min. |
| 8.6.4.13.1(k) Non-Egress Landings – Door Closers | | | 4 Min. | | | | | | | | | |
| 8.6.4.13.1(k) Egress Landings – Door Closers | 2 Min. | 2 Min. | 2 Min. | 2 Min. | 2 Min. | 2 Min. | 2 Min. | 2 Min. | 2 Min. | 2 Min. | 2 Min. | 2 Min. |
| 8.6.4.13.1(l) Door Restrictors | 5 Min. | 5 Min. | 5 Min. | 5 Min. | 5 Min. | 5 Min. | 5 Min. | 5 Min. | 5 Min. | 5 Min. | 5 Min. | 5 Min. |

Site
Jones Building

Maintenance Procedures

---

8.6.4.13.1(a) Non-Egress Landings – Door Locks

NOTE: Non-egress landings are every landing except the main lobby door used most often.

1. Position the car and gain access to the top of car by procedures established in the Field Employees' Safety Handbook.
2. Use the top of car operating device to place the elevator at a position convenient to work on the hoistway door equipment.
3. Remove dust covers.
4. Remove the cover to the interlock.
5. Observe the gap between the interlock hook and the stationary locking member. The gap should be set at between 1/8 in. to ¼ in. clearance. Adjust the clearance as needed.
6. Verify the car will not operate with the interlock open.

CAUTION: If the car will operate with an interlock open, repair or remove the elevator from operation and notify supervisor.

7. Replace the cover to the interlock and the dust cover.
8. Repeat steps 2 through 7 at all non-egress floors.
9. Place the elevator back in normal operation and check for proper operation.

ACTION: Do not check this complete on the maintenance record until all non-egress doors have been examined and maintained.

Type of Unit
Direct Hydraulic Elevator
Unit Serial No.
EE3763
Unit AHJ Number/Local Unit No
1

Maintenance Records

104

| Category 1 Tests 2016 | | | |
| --- | --- | --- | --- |
| Must be performed each calendar year and are due on the anniversary month of the previous test | | | |
| Test  108 | Due Date | Date Tested | Completed By |
| 8.6.4.19.15 Emergency Communications Cat. 1 Test | | | |
| 8.6.4.19.16 Door Restrictor Cat 1 Test | | | |
| 8.6.4.19.8 Power Operating of Door System Cat 1 Test | | | |
| 8.6.5.14.1 Relief Valve Verification of Setting and System Pressure Cat 1 Test | | | |
| 8.6.4.14.2 Hydraulic Cylinder and Pressure Piping Cat 1 Test | | | |
| 8.6.5.14.3(a) Normal Terminal Stopping Device Cat 1 Test | | | |
| 8.6.5.14.3 (e) Firefighters Emergency Operation Cat 1 Test | | | |
| 8.6.5.14.3(f) Standby or Emergency Operation Cat 1 Test | | | |
| 8.6.5.14.3(g) Door System Cat 1 Test | | | |
| 8.6.5.14.3(l) Anticreep and Low Oil Protection Cat 1 Test | | | |

Maintenance Records

Site
Jones Building

Maintenance Records
118

| Units at this Site | |
|---|---|
| Unit 612 (2)<br>Electric Geared Elevator | 2 % |
| Unit 615 (3)<br>Electric Geared Elevator | 2 % |
| Unit 619 (5)<br>Electric Geared Elevator | 100 % |
| Unit 612 (2)<br>Electric Geared Elevator | 2 % |
| Unit 631 (6)<br>Electric Geared Elevator | 2 % |
| Unit 632 (7)<br>Electric Geared Elevator | 0 % |
| Unit 637 (8)<br>Electric Geared Elevator | 100 % |
| Unit 640 (DW 2)<br>Dumbwaiter | 100 % |
| Unit 644 (DW 3)<br>Dumbwaiter | 100 % |

*Fig. 18*

MAINTENANCE CONTROL PROGRAM

BACKGROUND

Mechanical systems and electro-mechanical systems can include mechanical, electrical, electromechanical and electronic components and assemblies that can require periodic inspection, maintenance, repair and replacement. One non-limiting example of an electro-mechanical system is vertical transportation equipment, which can include passenger and freight elevators, escalators, moving walks, and the like.

In certain instances, local code authorities have established routine and periodic inspection, maintenance, repair and replacement schedules for select vertical transportation components and assemblies. One non-limiting example of a code authority for vertical transportation equipment is Section 8.6 of ASME A17.1/CSA B44 Safety Code for Elevators (Code).

In certain instances, the required inspection, maintenance, repair and replacement schedules can be compiled into "maintenance control programs". Also, in certain instances, the maintenance control programs can be automated with computers and the like.

However, conventional maintenance control programs (hereafter "conventional programs") have drawbacks that can be detrimental to their use. As one non-limiting example, conventional programs may not cover all of the components and assemblies incorporated into the vertical transportation unit. As another non-limiting example, conventional programs may not comply with the entirety of applicable vertical transportation safety code.

Other non-limiting examples of deficiencies with conventional programs include a lack of access to information concerning recently performed maintenance on a real time basis, a lack of positive identification of the person or persons performing maintenance tasks, incomplete documentation of the analysis to determine an interval or frequency of maintenance, a lack of indicators of the percentage of maintenance tasks completed compared to required maintenance tasks, a lack of procedures for the elevator personnel performing the maintenance tasks and the like.

Additional non-limiting examples of deficiencies with conventional programs include little to no accountability to a customer who is paying for maintenance, but who may be unaware and cannot be aware that all the maintenance tasks have been identified and performed and a lack of relevant information to establish the condition of the equipment relative to its expected life cycle. This can be particularly problematic as with no clear vision as to the rate of deterioration of the equipment, it may be difficult to establish if the deterioration of the equipment is simply due to age and use or if lack of proper maintenance is contributory to the degradation of the equipment.

Further non-limiting examples of deficiencies with conventional programs include a lack of effort to provide the analysis to determine the minimum level of maintenance to assure the equipment remains code compliant, which is the goal of the applicable code.

It would be beneficial to improve maintenance control programs.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the maintenance control program.

The above objects as well as other objects not specifically enumerated are achieved by a maintenance control program for use in maintaining mechanical and electro-mechanical equipment. The maintenance control program includes a completed survey of the mechanical and electro-mechanical equipment. The completed survey is configured to document the physical characteristics of the mechanical and electro-mechanical equipment and an assessment of a plurality of metrics concerning the mechanical and electro-mechanical equipment. An algorithm is configured to apply values to the assessment of the plurality of metrics. A schedule of code required maintenance tasks is developed for the mechanical and electro-mechanical equipment, wherein an interval of the required maintenance tasks is determined by the algorithm based on the values applied to the assessment of the plurality of metrics.

Various objects and advantages of the maintenance control program will become apparent to those skilled in the art from the following Detailed Description, when read in light of the accompanying drawings.

BRIEF DESCRIPTION OF THE DRAWINGS

FIG. 3 is a chart illustrating the equipment age metrics of the assessment phase of the maintenance control program of FIG. 1.

FIG. 4 is a chart illustrating the condition metrics of the assessment phase of the maintenance control program of FIG. 1.

FIG. 5 is a chart illustrating the accumulated wear metrics of the assessment phase of the maintenance control program of FIG. 1.

FIG. 6 is a chart illustrating the design metrics of the assessment phase of the maintenance control program of FIG. 1.

FIG. 7 is a chart illustrating the inherent quality metrics of the assessment phase of the maintenance control program of FIG. 1.

FIG. 8 is a chart illustrating the usage metrics of the assessment phase of the maintenance control program of FIG. 1.

FIG. 9 is a chart illustrating the environment metrics of the assessment phase of the maintenance control program of FIG. 1.

FIG. 10 is a chart illustrating the technology metrics of the assessment phase of the maintenance control program of FIG. 1.

FIG. 12 is a chart illustrating a global interval summation of the maintenance control program of FIG. 1.

FIG. 13 is a chart illustrating a global maintenance interval of the maintenance control program of FIG. 1.

FIG. 14a is a chart illustrating a maintenance record of the maintenance control program of FIG. 1.

FIG. 14b is a chart illustrating a maintenance procedure of the maintenance control program of FIG. 1.

FIG. 15 is a chart illustrating a test record of the maintenance control program of FIG. 1.

FIG. 16 is a chart illustrating a maintenance record of the maintenance control program of FIG. 1, showing entry of a completed maintenance task.

FIG. 17 is a chart illustrating a maintenance record of the maintenance control program of FIG. 1, showing completion of the maintenance tasks for a plurality of months.

FIG. 18 is a chart illustrating a maintenance record of the maintenance control program of FIG. 1, showing the completion percentages for various equipment units.

DETAILED DESCRIPTION

Figure 1:
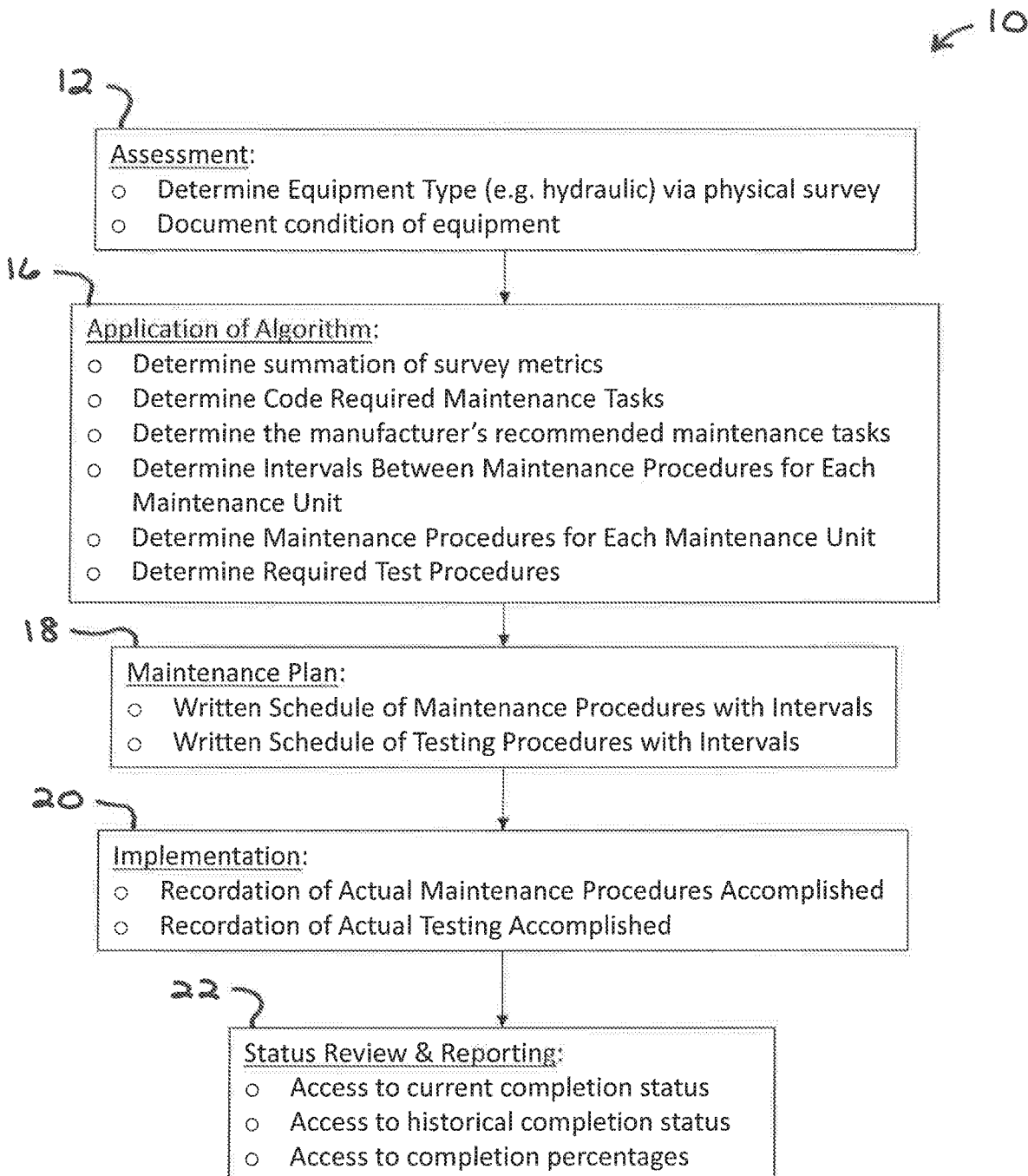
FIG. 1 is a flow chart illustrating the steps of a maintenance control program.

The maintenance control program will now be described with occasional reference to specific embodiments. The maintenance control program may, however, be embodied in different forms and should not be construed as limited to the embodiments set forth herein. Rather, these embodiments are provided so that this disclosure will be thorough and complete, and will fully convey the scope of the maintenance control program to those skilled in the art.

Unless otherwise defined, all technical and scientific terms used herein have the same meaning as commonly understood by one of ordinary skill in the art to which the maintenance control program belongs. The terminology used in the description of the maintenance control program is for describing particular embodiments only and is not intended to be limiting of the maintenance control program. As used in the description of the maintenance control program and the appended claims, the singular forms "a," "an," and "the" are intended to include the plural forms as well, unless the context clearly indicates otherwise.

Unless otherwise indicated, all numbers expressing quantities of dimensions such as length, width, height, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the maintenance control program. Notwithstanding that the numerical ranges and parameters setting forth the broad scope of the maintenance control program are approximations, the numerical values set forth in the specific examples are reported as precisely as possible. Any numerical values, however, inherently contain certain errors necessarily resulting from error found in their respective measurements.

The description and figures disclose a maintenance control program (hereafter "program"). Generally, the program is a system that documents the assemblies, subassemblies and components of a mechanical or electro-mechanical system requiring maintenance tasks, develops a program of scheduled maintenance tasks, develops a frequency of the maintenance tasks using an algorithm that analyzes and calculates the objective data and provides an input system to allow for recordation of survey data, evaluation data, time, date, and identification of maintenance technician as the maintenance tasks are completed. The program also schedules and documents required tests, logs, checks, repair tasks, replacement tasks, callbacks, testing tasks, and inspection tasks. The program is further configured to provide a reporting system that allows historic and real time maintenance information to be displayed on the smart device or on a web browser from any location with authorized access, primarily detailing the maintenance tasks remaining to be completed, callbacks, repairs, replacements, alterations, tests and checks as required. The program is further configured to assure every assembly, subassembly and component of the mechanical or electro-mechanical system receives maintenance completed by the maintenance technician. The program will be described below in the context of a vertical transportation unit. However, it should be understood that the concepts, processes and procedures described herein are applicable to other mechanical or electro-mechanical systems requiring maintenance tasks. In addition to the herein described example of vertical transportation equipment, additional non-limiting examples include heating, ventilating and air conditioning equipment and fire control equipment.

The governing standard for vertical transportation equipment recommended for adoption in the United States and Canada is the ASME A17.1/CSA B44 Safety Code for Elevators and Escalators (the "Code"). The Code specifies that all equipment must have a written Maintenance Control Program ("MCP") including Code required: maintenance tasks, maintenance procedures, examinations, tests and specifies specific records for retention on the conveyances. Maintenance, repair, replacement, and testing tasks are required to be completed on "applicable components" enumerated in the Code for all vertical transportation devices. The Code further requires specific recording of maintenance, repairs, replacement, and testing in addition to inspections. In the example provided herein, each vertical transportation component must be enumerated by Code requirement number, a procedure written for that component, and finally an analysis completed to determine the frequency of that maintenance task.

Referring now to FIG. 1, an overall summary of the phases of the program are illustrated generally at 10. The program 10 includes an assessment phase 12, an algorithm application phase 16, a maintenance plan phase 18, an implementation phase 20 and a status review and reporting phase 22. Each of the phases 12, 14, 16, 18, 20 and 22 will be discussed in more detail below.

In certain instances, the phases 12, 14, 16, 18, 20 and 22 of the program 10 are administered, managed and completed with the use of electronic-based and/or computer-based equipment, such as the non-limiting examples of laptop computers, tablets, smartphones and the like. It has been found that the use of electronic-based and/or computer-based equipment facilitates ease of use of the program. However, it is within the contemplation of the program that electronic-based and/or computer-based equipment is not necessary for the implementation and use of the program.

Referring again to FIG. 1, the assessment phase 12 includes a determination of the type and nature of the vertical transportation equipment. This is accomplished by a physical survey. The term "physical survey", as used herein, is defined to mean an on-site, manned inspection of the applicable equipment. The physical survey results in a record of an assessment of the condition of the equipment.

Figure 2A:
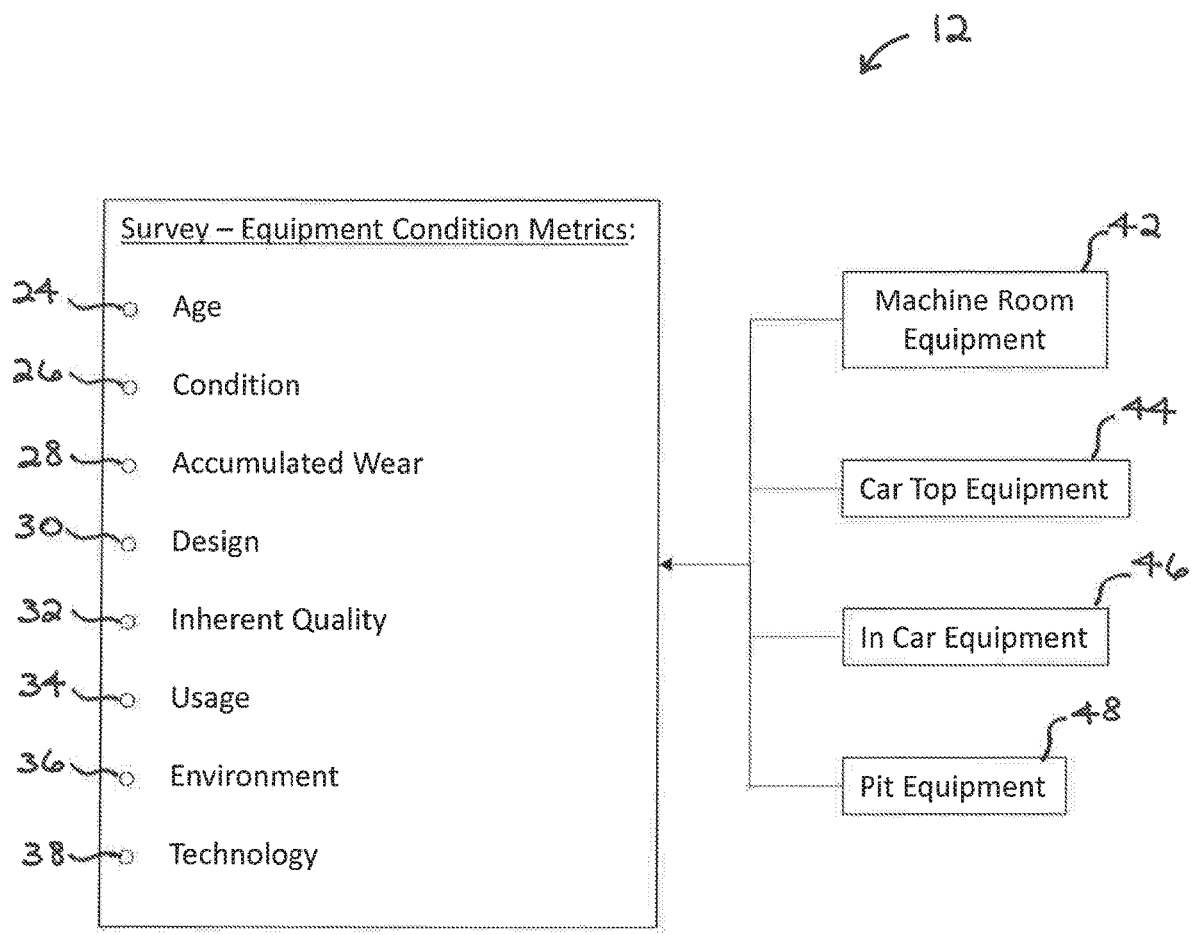
FIG. 2a is a chart illustrating the equipment condition metrics of the assessment phase of the maintenance control program of FIG. 1.

Referring now to FIG. 2a, the assessment step 12 records the selected metric values of the vertical transportation equipment including the age 24, condition 26, accumulated wear 28, design 30, inherent quality 32, usage 34, environment 36 and the technology 38. The metric values 24, 26, 28, 30, 32, 24, 36 and 38 are applied to applicable equipment located in the machine room 42, car top 44, in car 46 and the pit 48.

Figure 2B:
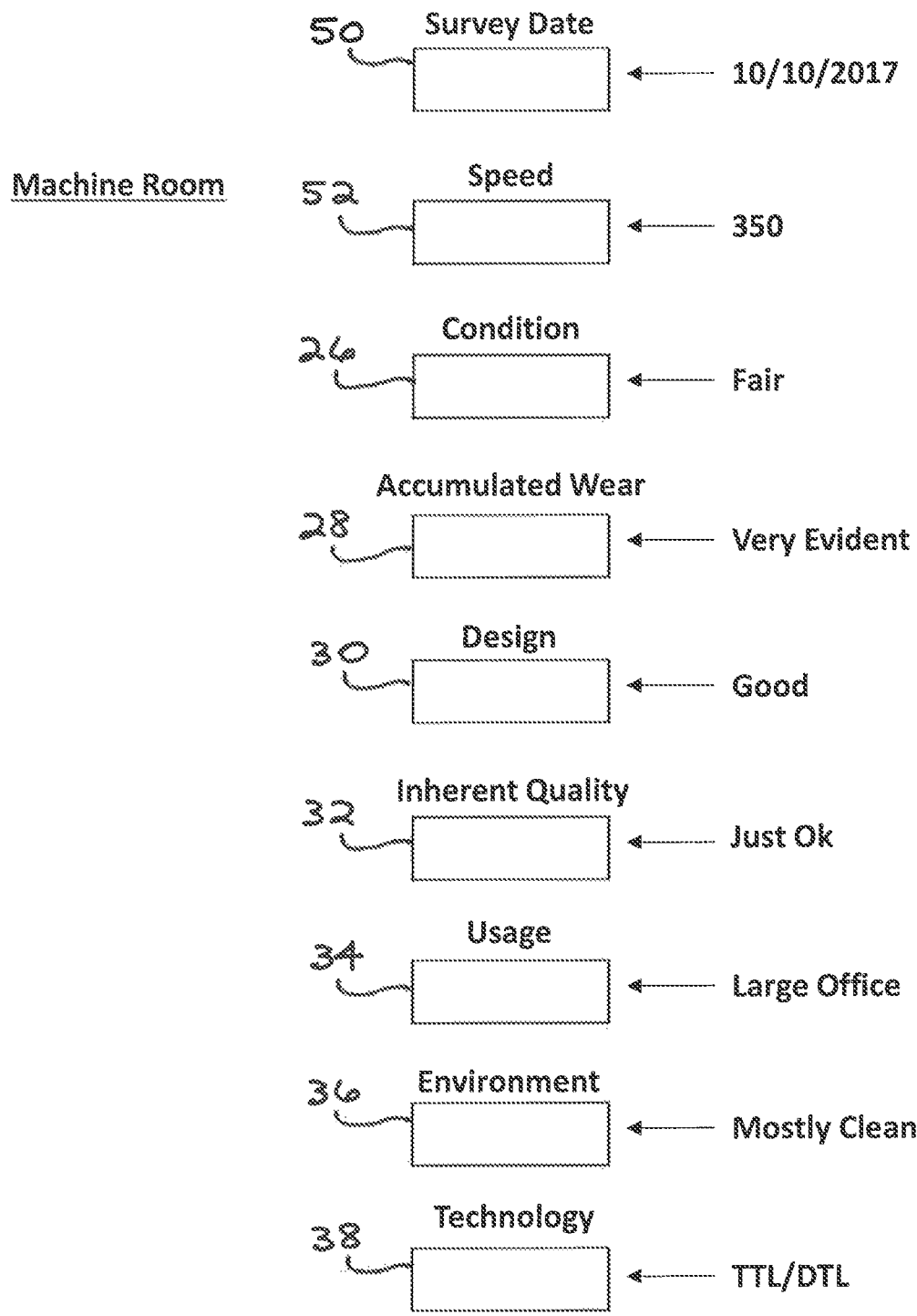
FIG. 2b is a chart illustrating survey evaluation data of the assessment phase of the maintenance control program of FIG. 1.
Figure 2C:
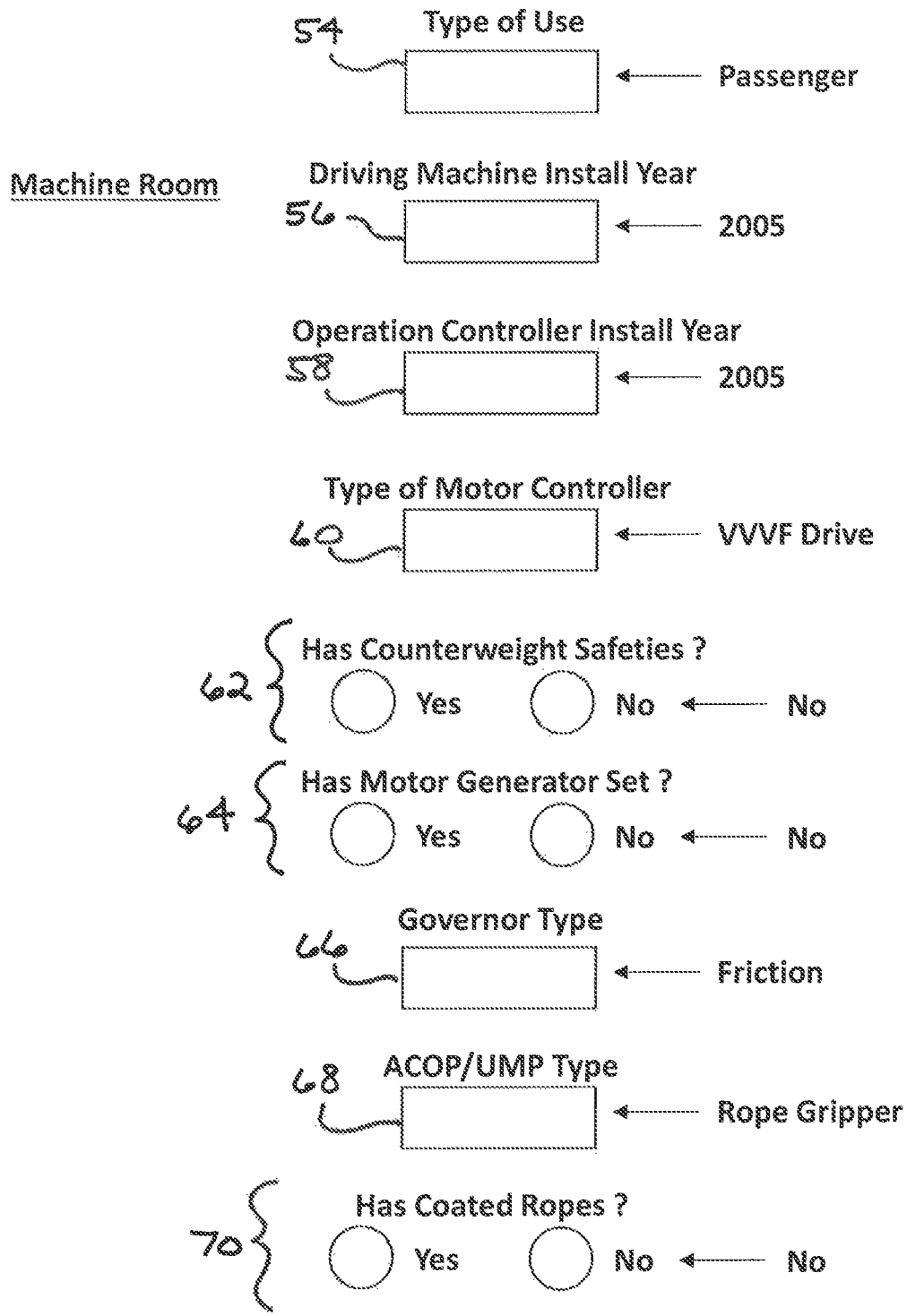
FIG. 2c is a chart illustrating additional survey evaluation data of the assessment phase of the maintenance control program of FIG. 1.

Referring now to FIGS. 2b and 2c, one embodiment of a survey for machine room equipment 42 is illustrated. In an initial step, a survey date 50 is entered. Next, the rated speed 52 of the vertical transportation unit is entered. In a next step 26, an assessment of the condition of the vertical transportation unit is entered. The term "condition", as used herein, is defined to mean a particular state of repair or ability to function. The condition metric 26 is based on the working state of the sub-systems with respect to its design or normal function.

Referring now to FIG. 4, the condition metric 26 can be assigned seven assessment values. If the machine room equipment is in mint condition, the condition metric is assigned the value of 1. If the machine room equipment is in very good condition, the condition metric is assigned the value of 2. If the machine room equipment is in good condition, the condition metric is assigned the value of 3. If the machine room equipment is in fair condition, the condition metric is assigned the value of 4. If the machine room equipment is in bad condition, the condition metric is assigned the value of 5. If the machine room equipment is in very bad condition, the condition metric is assigned the value of 6. Finally, if the machine room equipment is in the worst condition, the condition metric is assigned the value of 7.

Referring again to FIG. 2b in a next step of the survey, an assessment of the accumulated wear 28 of the vertical transportation unit is entered. The term "accumulated wear", as used herein, is defined to mean the erosion or displacement of material that occurs due to interactions between surfaces during use. All sliding and rolling surfaces will show wear. Wear is influenced by use, design, maintenance performed, lubrication, and environment. For every device, the accumulation of wear will influence ride quality, sub-system reliability, and up-time performance measured in terms of callbacks, repairs, and replacements.

Referring now to FIG. 5, the accumulated wear metric 28 can be assigned seven assessment values. If the machine room equipment shows no accumulated wear, the accumulated wear metric is assigned the value of 1. If the machine room equipment shows slight accumulated wear, the accumulated wear metric is assigned the value of 2. If the machine room equipment shows noticeable accumulated wear, the accumulated wear metric is assigned the value of 3. If the machine room equipment shows very evident accumulated wear, the accumulated wear metric is assigned the value of 4. If the machine room equipment appears to be worn, the accumulated wear metric is assigned the value of 5. If the machine room equipment appears to be very worn, the accumulated wear metric is assigned the value of 6. Finally, if the machine room equipment needs to be replaced, the accumulated wear metric is assigned the value of 7.

Referring again to FIG. 2b in a next step of the survey, an assessment of the design 30 of the vertical transportation unit is entered. The term "design", as used herein, is defined to mean a favorable history of operation and trouble free reputation. Over time, vertical transportation equipment develops a history of characteristics that are tangible to vertical transportation professionals relative to equipment of another manufacturer. Factors influencing the design can include the non-limiting examples of size and strength of materials used in manufacture, attention to detail of serviceability, ease of assembling/disassembling, appearance and the like. Over time, designs can develop wear factors that require more maintenance than designs that have more robust components requiring less maintenance tasks. Degradation of components and sub-system malfunctions can occur earlier in less robust designs.

Referring now to FIG. 6, the design metric 30 can be assigned seven assessment values. If the machine room equipment presents the best design, the design metric is assigned the value of 1. If the machine room equipment presents a great design, the design metric is assigned the value of 2. If the machine room equipment presents a good design, the design metric is assigned the value of 3. If the machine room equipment presents a fair design, the design metric is assigned the value of 4. If the machine room equipment presents a just ok design, the design metric is assigned the value of 5. If the machine room equipment presents a poor design, the design metric is assigned the value of 6. Finally, if the machine room equipment presents the worst design, the design metric is assigned the value of 7.

Referring again to FIG. 2b in a next step of the survey, an assessment of the inherent quality 32 of the vertical transportation unit is entered. The term "inherent quality", as used herein, is defined to mean permanent and inseparable structural characteristics that result in reliable operation and infrequency repair and replacement of components. Skilled, experienced vertical transportation professional can generally determine components and assemblies having a high quality compared to components and assemblies built-in or inherent quality flaws.

Referring now to FIG. 7, the inherent quality metric 32 can be assigned seven assessment values. If the machine room equipment presents as having the highest inherent quality, the inherent quality metric is assigned the value of 1. If the machine room equipment presents as having a great inherent quality, the inherent quality metric is assigned the value of 2. If the machine room equipment presents a good inherent quality, the inherent quality metric is assigned the value of 3. If the machine room equipment presents a fair inherent quality, the inherent quality metric is assigned the value of 4. If the machine room equipment presents a just ok inherent quality, the inherent quality metric is assigned the value of 5. If the machine room equipment presents a poor inherent quality, the inherent quality metric is assigned the value of 6. Finally, if the machine room equipment presents the lowest inherent quality, the inherent quality metric is assigned the value of 7.

Referring again to FIG. 2b in a next step of the survey, an assessment of the usage 34 of the vertical transportation unit is entered. The term "usage", as used herein, is defined to mean the number of times the vertical transportation unit operates in one day. In certain instances, vertical transportation units only operate (such as for example, open and close the doors, make an up or down run, open and close the doors) 20 times in a single day. In other instances, the vertical transportation unit can operate 2,500 times in a single day. As the vertical transportation unit increasingly operates, there is a need for more frequent maintenance tasks.

Referring now to FIG. 8, the usage metric 34 can be assigned seven assessment values. If the machine room equipment has usage based on the Americans with Disabilities Act (ADA) or minimal usage, the usage metric is assigned the value of 1. If the machine room equipment has usage as typical in a small apartment or small condominium, the usage metric is assigned the value of 2. If the machine room equipment has usage as typical in a large apartment or large condominium, the usage metric is assigned the value of 3. If the machine room equipment has usage as typical in an office having less than 20 floors, the usage metric is assigned the value of 4. If the machine room equipment has usage as typical in an office having more than 20 floors, the usage metric is assigned the value of 5. If the machine room equipment has usage that is very busy, such as typical in an observation building, the usage metric is assigned the value of 6. Finally, if the machine room equipment has usage as typical in a medical or convalescent building, the usage metric is assigned the value of 7.

Referring again to FIG. 2b in a next step of the survey, an assessment of the environment 36 of the vertical transportation unit is entered. The term "environment", as used herein, is defined to mean the surroundings or conditions in which the vertical transportation unit operates. In certain instances, the vertical transportation unit can be exposed to environmental conditions, such as the non-limiting examples of heat, humidity, dirt, lint, radiation, chemicals and the like. Exposure to increasingly extreme conditions can affect the reliable operation and frequency of repair and replacement of components.

Referring now to FIG. 9, the environment metric 36 can be assigned seven assessment values. If the machine room equipment has a very clean environment, the environment metric is assigned the value of 1. If the machine room equipment has a mostly clean environment, the environment metric is assigned the value of 2. If the machine room equipment has a dusty environment, the environment metric is assigned the value of 3. If the machine room equipment has a grimy environment, the environment metric is assigned the value of 4. If the machine room equipment has a dirty environment, the environment metric is assigned the value of 5. If the machine room equipment has a very dirty environment, the environment metric is assigned the value of 6. Finally, if the machine room equipment has a filthy environment, the environment metric is assigned the value of 7.

Referring again to FIG. 2b in a next step of the survey, an assessment of the technology 38 of the vertical transportation unit is entered. The term "technology", as used herein, is defined to mean the collection of techniques, skills, methods, structures and processes used in the construction of the vertical transportation units. In certain instances, the vertical transportation unit can be constructed with technology or technologies that can affect the reliable operation and frequency of repair and replacement of components.

Referring now to FIG. 10, the technology metric 38 can be assigned seven assessment values. If the machine room equipment is based on computer-related technology, the technology metric is assigned the value of 1. If the machine room equipment is based on TTL or DTL (Transistor-Transistor Logic, Diode-Transistor Logic) technology, the technology metric is assigned the value of 2. If the machine room equipment is based on ice-cube relay technology, the technology metric is assigned the value of 3. If the machine room equipment is based on open relay technology, the technology metric is assigned the value of 4. If the machine room equipment is based on carbon relay technology, the technology metric is assigned the value of 5. If the machine room equipment is based on phenolic board technology, the technology metric is assigned the value of 6. If the machine room equipment is based on slate board technology, the technology metric is assigned the value of 7.

Referring now to FIG. 2c in a next step 54 of the survey, the type of use is entered. Typical entries include "passenger", "freight" and the like. In next steps 56, 58 of the survey, the installation years of the driving machine and the operational controller are entered. The age of the equipment is a direct reflection of some general designs that have changed over the years. Early technologies were open controllers on sheets of slate. The early technologies evolved to enclosed controllers with large relays, which then evolved to enclosed controllers with smaller relays. The relay-based systems then evolved to solid state (Transistor-Transistor Logic, Diode-Transistor Logic) controllers, which then evolved to computer-based controls in enclosures with filtered air. Each vintage of controller requires specific maintenance tasks, with the generally older systems requiring additional maintenance tasks.

Referring now to FIG. 3, the age metric 24 can be assigned seven assessment values. If the machine room equipment is less than 1 year old, the age metric is assigned the value of 1. If the machine room equipment is 1 year to 5 years old, the age metric is assigned the value of 2. If the machine room equipment is 6 years to 10 years old, the age metric is assigned the value of 3. If the machine room equipment is 11 years to 15 years old, the age metric is assigned the value of 4. If the machine room equipment is 16 years to 20 years old, the age metric is assigned the value of 5. If the machine room equipment is 21 years to 30 years old, the age metric is assigned the value of 6. Finally, if the machine room equipment is over 30 years old, the age metric is assigned the value of 7.

Referring again to FIG. 2c in a next step 60 of the survey, the type of motor controller is entered. In a next step 62 of the survey, the existence of counterweight safeties is indicated with a simple yes or no answer. In a next step 64 of the survey, the existence of a motor generator set is indicated with a simple yes or no answer. In next steps 66 and 68 of the survey, the governor type is indicated and the type of Ascending Car Overspeed Protection (ACOP) is indicated. In a final step 70 of the machine room equipment survey 42, the existence of coated ropes in indicated with a simple yes or no answer.

Figure 2D:
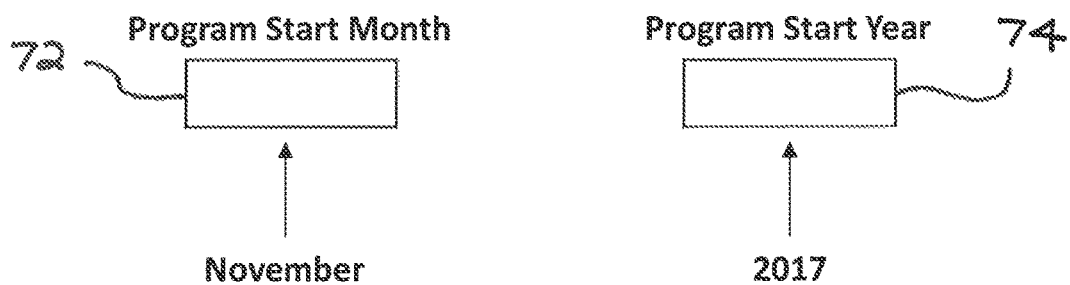
FIG. 2d is a chart illustrating additional survey evaluation data of the assessment phase of the maintenance control program of FIG. 1.

Referring again to FIG. 2a, surveys are completed in a similar manner for the car top equipment 44, the in car equipment 46 and the pit equipment 48. Referring now to FIG. 2d, once the surveys 42, 44, 46 and 48 are completed, the final inputs include the program start month 72 and the program start year 74.

Referring now to FIG. 1, with the assessment 12 and completion of the physical survey, the nature and condition of the equipment has been documented. In a next step 16, an algorithm is applied to the data to determine a written maintenance plan 18.

Figure 11:
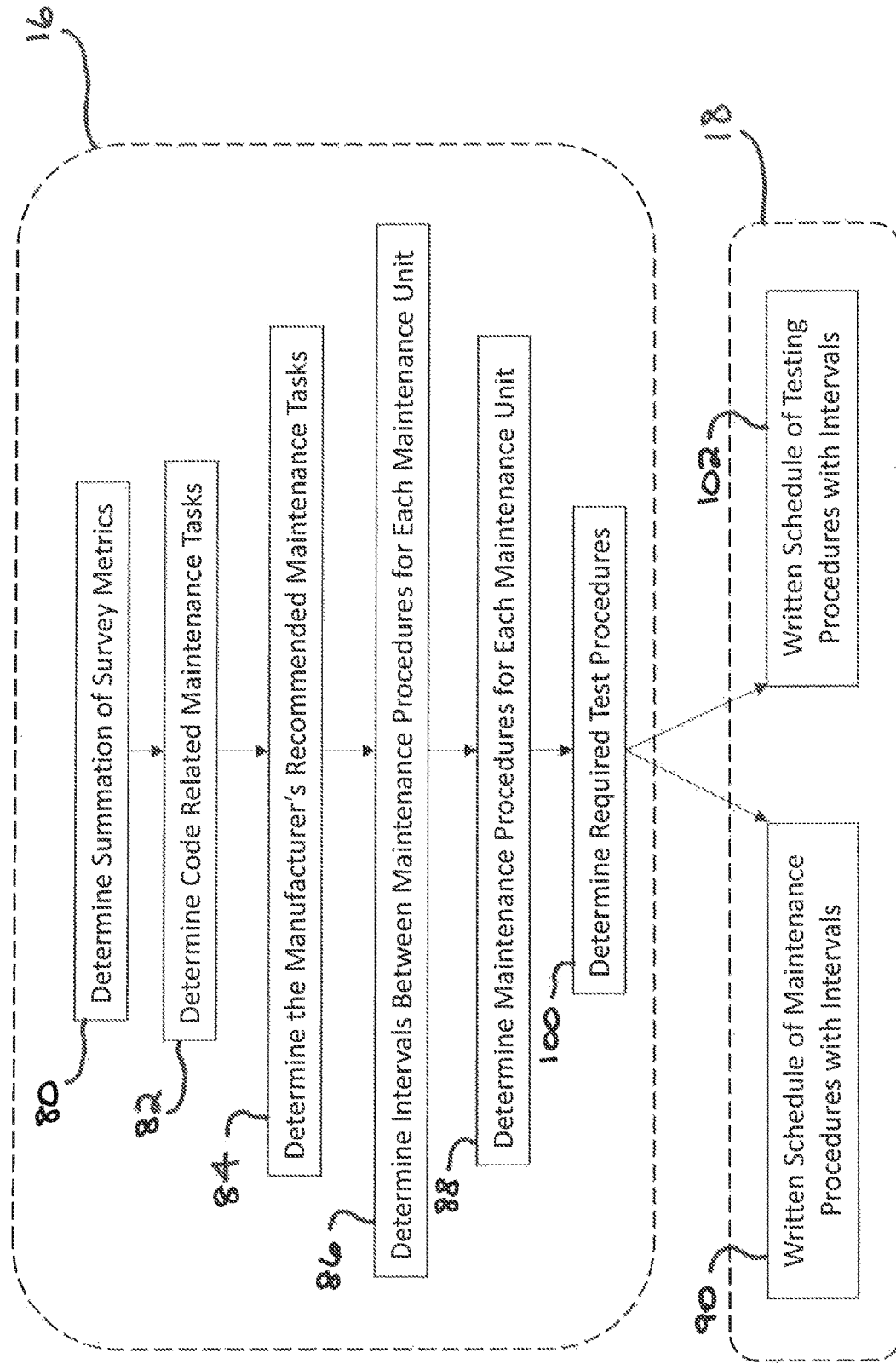
FIG. 11 is a flow chart illustrating the steps of applying an algorithm of the maintenance control program of FIG. 1.

Referring now to FIG. 11, the steps of applying the algorithm 16 are illustrated. In a first step 80, using the data accumulated in the survey, the algorithm codes a weighting system to establish a global interval summation, with the weighting selections based on empirical data and experience of the surveyors. As discussed above and as required by typical vertical transportation safety codes, the specified scheduled maintenance intervals shall be based on the equipment age, condition, accumulated wear, design, inherent quality, usage, environmental and technology.

Referring now to FIG. 12, one non-limiting example of a global interval summation 80 is illustrated. Based on the survey data, the metric for age is assigned a value of 2, the metric for condition is assigned a value of 4, the metric for accumulated wear is assigned a value of 3, the metric for design is assigned a value of 1, the metric for inherent quality is assigned a value of 2, the metric for usage is assigned a value of 5, the metric for environment is assigned a value of 6 and the metric for technology is assigned a value of 3. For the illustrated equipment unit, the global interval summation 82 has a value of 26.

Referring again to FIG. 11 in a next step 82, the applicable vertical transportation safety code is reviewed for code required maintenance tasks. The vertical transportation safety code required maintenance tasks are identified by safety code reference number.

Referring again to FIG. 11 in a next step 84, the manufacturers recommended maintenance tasks are identified for unique products and devices or circuits with Safety Integrity Levels (SIL) ratings, as the vertical transportation safety code requires. As one non-limiting example, advances in technologies can enter the marketplace prior to the implementation of vertical transportation safety code requirements that address the maintenance, repair, replacement, and testing of these technologies. When this happens, the manufacturer is required to provide maintenance tasks, procedures and expected maintenance task intervals to assure the equipment remains in Code compliance.

Referring again to FIG. 11 in a next step 86, the global maintenance interval between the vertical transportation safety code required maintenance tasks is determined using the global interval summation 82. Referring now to FIG. 13, one non-limiting example of a global maintenance interval 84 is illustrated. Based on the global interval summation 80, a value of less than 20 yields a maintenance interval of every 12 months. A global interval summation having a value between 20 and 28 yields as maintenance interval of every 9 months. A global interval summation having a value between 28 and 35 yields as maintenance interval of every 6 months. A global interval summation having a value between 35 and 42 yields as maintenance interval of every 4 months. A global interval summation having a value between 42 and 49 yields as maintenance interval of every 3 months. A global interval summation having a value between 49 and 56 yields as maintenance interval of every 2 months. Finally, a global interval summation having a value over 56 yields as a monthly maintenance interval.

Referring again to FIG. 11 in a next step 88, once the applicable vertical transportation safety code required maintenance tasks and the manufacturer's recommended maintenance tasks are identified, the maintenance procedures for each of the tasks are identified. At the completion of step 88, a maintenance record 90 is prepared for each maintenance unit. Referring now to FIG. 14a, a representative maintenance record 90 is illustrated for a direct hydraulic elevator having a Unit Serial No. EE3763. The maintenance record 90 includes a first column 92 referencing vertical transportation safety code numbers and including specific maintenance tasks. Each grid cell contains a reference to an expected duration time in minutes that the maintenance task should take on average. This assures the maintenance personal has an instruction to perform the task for a specified duration.

In this manner, the specific maintenance tasks are organized in a logical manner on the maintenance record 90. Grid locations that have a light-colored background indicate when a required task should to be performed. Grid locations that have a dark-colored background indicate that a task is not required to be performed.

Referring again to FIG. 14a, a first non-limiting example is shown at 94, the vertical transportation safety code number is 8.6.4.13.1(a) and the specific maintenance task is "Egress Landings—Door Locks". The maintenance record also includes a header row 96 indicating the interval of the maintenance tasks. Continuing the example of the Door Locks, the header row 96 indicates 5 minutes of required maintenance to be performed on a monthly interval.

Referring again to FIG. 14a with another non-limiting example at 98, the vertical transportation safety code number is 8.6.4.13.1(i) and the specific maintenance task is "Car Door Clutch". Row 98 indicates 10 minutes of required maintenance to be performed on a 6 month interval. Since the months of July, 2016 through September, 2016, November, 2016 through March, 2017 and May, 2017 through June, 2017 are blacked out, no maintenance is required in those months.

Referring now to FIG. 14b, a non-limiting example of a maintenance procedure 99 is illustrated. The maintenance procedure 99 describes the sequential steps of the task of maintaining the non-egress landings door locks in compliance with vertical transportation safety code 8.6.4.13.1(a). As shown in FIG. 14b, the procedure 99 includes 9 sequential steps. In addition, caution and action notes alert the maintenance personal of additional potential issues.

Referring again to FIG. 11 in a next step 100, the vertical transportation safety code required test procedures are identified. At the completion of step 100, a test record 102 is prepared for each maintenance unit. Referring now to FIG. 15, a representative test record 102 is illustrated for a direct hydraulic elevator having a Unit Serial No. EE3763. The test record 102 includes a first column 104 referencing vertical transportation safety code numbers and including specific testing tasks. As a non-limiting example at 106, the vertical transportation safety code number is 8.6.4.19.15 and the specific testing task is "Emergency Communications Cat. 1". The test record 102 also includes a header row 108 indicating the due date of the test tasks, the date the unit was tested and the person completing the test task.

Referring again to FIG. 1, once the maintenance record 90 and the test record 102 are prepared, the program 10 enters the implementation phase 20. The implementation phase 20 includes the recordation of actual maintenance tasks and procedures that have been accomplished on a given equipment unit. The implementation phase 20 also includes the recordation of actual tests that have been accomplished on a given equipment unit.

Figure 16:
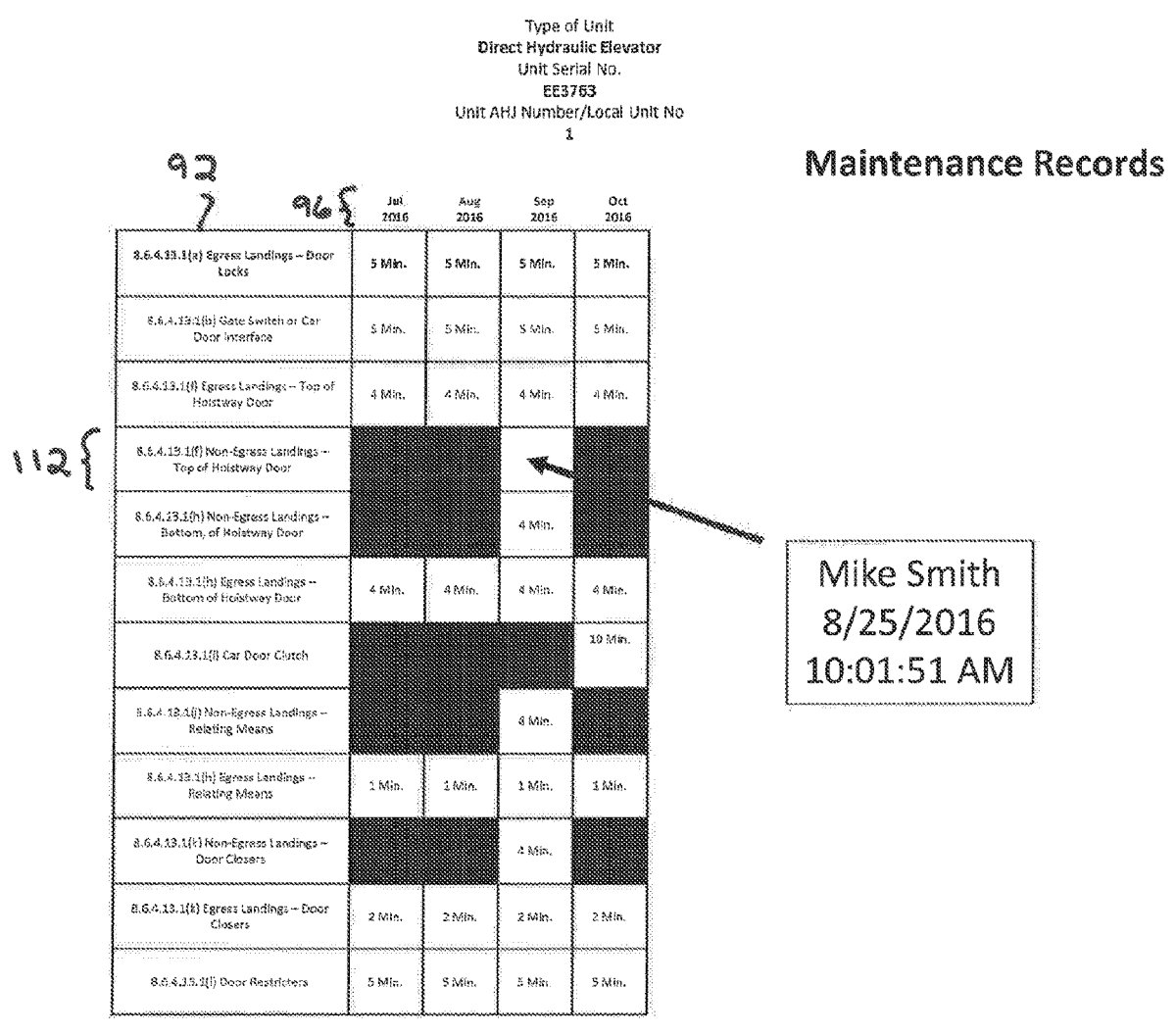

Referring now to FIG. 16, a portion of the maintenance record 90 is shown at 110. As discussed above, the maintenance record 110 includes the first column 92 referencing vertical transportation safety code numbers and including specific maintenance tasks and a header row 96 indicating the interval of the maintenance tasks. Upon completion of a maintenance task, the maintenance personal enters his/her name, the date and the time into the appropriate box. As a non-limiting example 112, the maintenance task for the non-egress landings—top of hoistway door was completed for the month of September, 2016. Upon completion, maintenance personal named Mike Smith enters in name, the completion date of Aug. 25, 2016. The performance of the scheduled maintenance tasks continues and as the maintenance tasks are completed, completion entries are entered in a similar manner.

Referring again to FIG. 1, simultaneous with the completion and recordation of the maintenance tasks and tests, the program 10 enters the status review phase 22. In the status review phase 22, the current completion status and current completion percentages can be viewed for a given maintenance unit, or group of units in a specific location.

Figure 17:
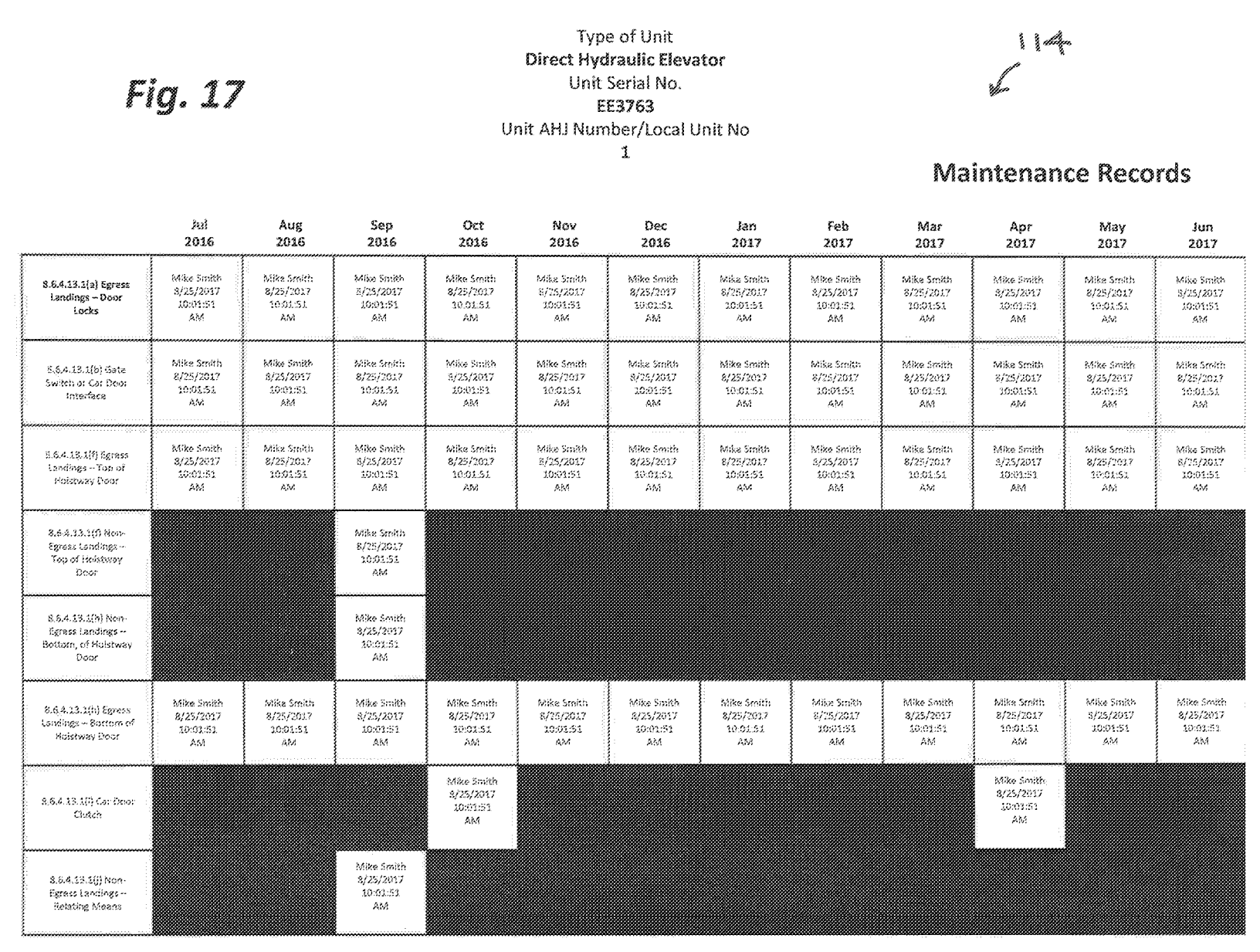

Referring now to FIG. 17, the maintenance record 90, as shown in FIG. 14a, has been updated to include actual completion data for each of the scheduled maintenance tasks, thereby forming a current completion status record 114. Current completion status record 114 shows the actual completion data for each vertical transportation safety code required maintenance task, as well as the name of the maintenance personal who completed the maintenance tasks, the date and the time. In the embodiment shown in FIG. 17, the completion dates of an entire year of maintenance tasks can be readily and easily viewed.

In a similar manner, the completion dates of the test tasks for a group of equipment units can be readily and easily viewed. Referring now to FIG. 18, a maintenance record 116 illustrated the maintenance task completion, as indicated by column 118 for a group of elevators and dumbwaiters listed in column 120. As non-limiting examples 122 and 124, the Unit 612 (2) elevator shows a current maintenance task completion value of 2% and the Unit 637 (8) elevator shows a current maintenance task completion value of 100%.

Referring again to FIG. 1, as described above, in some instances the program 10 can be administered, managed and completed with the use of electronic-based and/or computer-based equipment. In those instances, the survey data, specific vertical transportation safety code required maintenance, test information and the completion information can be stored in a relational, interactional database. The stored database can be accessed electronically and can be configured to produce hardcopy prints. In certain instances, it may be desirable to store the hardcopy prints on site with the equipment. The hardcopy printouts can include a complete, one-year record of the required maintenance and test tasks for a select equipment unit. Since the record is custom to a select equipment unit, the record is not valid for other equipment units.

Further, in certain instances, the relational, interactional database can be accessed by the maintenance personal, the company under contract to perform the maintenance, the building owner, the elevator inspector, or other persons authorized to access the relational, interactional database.

It is within the contemplation of the program 10, that the program 10 can include structures, mechanisms, devices and/or software configured to transmit/receive wireless signals to connect with similar structures located near the equipment unit. Such a connection provides documentation that the program 10 is positioned in proximity to the equipment unit and can be used by the maintenance personal to record completion of maintenance tasks. In a similar manner, the absence of the connected signals can be recorded at the time the maintenance technician attempts to record the completion of maintenance tasks while not in proximity to the equipment unit.

The program 10 provides many benefits, although all benefits may not be available in all embodiments. First, the program 10 overcomes deficiencies in the prior art by extending the life of vertical transportation equipment by identifying and managing the required maintenance tasks. Second, the program 10 uses objective algorithms to establish the intervals with specific repeatable results. In contrast, many maintenance control programs are merely a list of the components with no analysis as to the required maintenance tasks. Instead, these programs rely on personnel to make evaluations absent an organized system or organized metrics. Third, the program 10 provides the ability for the maintenance provider and building owner to see which tasks have been completed, and which still need to be done. Fourth, the program 10 provides a summation of expected maintenance time for the owner's evaluation of the relative cost of maintenance. Fifth, the program 10 provides easily and readily accessible documentation of procedures in hand, when needed and without the need to carry books or other documentation. Sixth, the program 10 provides the ability to determine the cost effectiveness of altering or modernizing equipment using quantifiable methods to determine return on investment based on increasing maintenance prices due to age and other metrics. Seventh, the program 10 provides owners with an expected cost of maintenance based on the rational summing of actual times that the required maintenance and testing tasks will take, then multiplying the actual task times by the local labor rate to establish a base cost. Bidders bidding less than the base cost can be eliminated from the bid process by virtue of the bid labor rate and necessary time it takes to perform the work. By necessity, this will disallow underbidding, which results in infrequent maintenance and increased hazard exposure and injury. Eighth, the program 10 documents safety code required repairs, replacements, tests, inspections, and any other actions required. The output of these documented records provides required documentation required by the adopted vertical transportation safety codes. Ninth, the documented records can be viewed online using a smart device or with hardcopy printouts. Tenth, the program 10 can illustrate uncompleted maintenance tasks. The documented uncompleted maintenance tasks can be used for crediting against future maintenance billings and providing a list of potential non-conformances for correction.

Summarizing, the program provides a survey of the equipment, an analysis of the needed frequencies of maintenance, the procedure expected to be performed, a method to record and identify the time and date of the task completion. It further allows instant access to current completion status, can be used to view historical completion status and its completion percentages can be used in contract with the maintenance provider to discount maintenance fees when the tasks are not performed per contract.

The principle and mode of operation of the electronic maintenance control program have been described in certain embodiments. However, it should be noted that the electronic maintenance control program may be practiced otherwise than as specifically illustrated and described without departing from its scope

What is claimed is:

1. A maintenance control program for use in maintaining mechanical and electro-mechanical equipment, the maintenance control program comprising:
   a completed physical survey of the mechanical and electro-mechanical equipment, the completed physical survey configured to document the physical characteristics of the mechanical and electro-mechanical equipment based on the age, condition, accumulated wear, design, inherent quality, usage, environment and technology of the mechanical and electro-mechanical equipment;
   a plurality of metrics assigned to each of the age, condition, accumulated wear, design, inherent quality, usage, environment and technology concerning the mechanical and electro-mechanical equipment based on the physical survey;
   an algorithm configured to apply values to the plurality of metrics, the algorithm further configured to develop a scheduled maintenance interval for each of the mechanical and electro-mechanical equipment; and
   a schedule of code required maintenance tasks for the mechanical and electro-mechanical equipment, wherein an interval of the required maintenance tasks is determined by the algorithm based on the values applied to of the plurality of metrics and a determination of the manufacturers recommended maintenance tasks.

2. The maintenance control program of claim 1, wherein the schedule of code required maintenance tasks includes testing requirements.

3. The maintenance control program of claim 1, wherein the schedule of code required maintenance tasks includes repair requirements.

4. The maintenance control program of claim 1, wherein an assessment of the mechanical and electro-mechanical equipment having an age of one to five years old is assigned a metric of 2.

5. The maintenance control program of claim 1, wherein an assessment of the mechanical and electro-mechanical equipment having an age of twenty-one to thirty years old is assigned a metric of 6.

6. The maintenance control program of claim 1, wherein an assessment of the mechanical and electro-mechanical equipment in mint condition receives a metric of 1.

7. The maintenance control program of claim 1, wherein an assessment of the mechanical and electro-mechanical equipment in very bad condition receives a metric of 6.

8. The maintenance control program of claim 1, wherein an assessment of the mechanical and electro-mechanical equipment showing no accumulated wear receives a metric of 1.

9. The maintenance control program of claim 1, wherein as assessment of the mechanical and electro-mechanical equipment showing a very worn condition receives a metric of 6.

10. The maintenance control program of claim 1, wherein an assessment of the mechanical and electro-mechanical equipment having the best design receives a metric of 1.

11. The maintenance control program of claim 1, wherein as assessment of the mechanical and electro-mechanical equipment having poor design receives a metric of 6.

12. The maintenance control program of claim 1, wherein an assessment of the mechanical and electro-mechanical equipment having a poor inherent quality is assigned a metric of 6.

13. The maintenance control program of claim 1, wherein an assessment of the mechanical and electro-mechanical equipment having a great inherent quality is assigned a metric of 2.

14. The maintenance control program of claim 1, wherein as assessment of the mechanical and electro-mechanical equipment having minimal usage receives a metric of 1.

15. The maintenance control program of claim 1, wherein an assessment of the mechanical and electro-mechanical equipment having medical usage is assigned a metric of 7.

16. The maintenance control program of claim 1, wherein an assessment of the mechanical and electro-mechanical equipment operating in a very clean environment is assigned a metric of 1.

17. The maintenance control program of claim 1, wherein an assessment of the mechanical and electro-mechanical equipment operating in a filthy environment receives a metric of 7.

18. The maintenance control program of claim 1, wherein an assessment of the mechanical and electro-mechanical equipment having computer technology is assigned a metric of 1.

19. The maintenance control program of claim 1, wherein an assessment of the mechanical and electro-mechanical equipment having slate board technology receives a metric of 7.

20. The maintenance control program of claim 1, wherein the algorithm is configured to calculate a global interval summation based on the values applied to the plurality of metrics and the scheduled maintenance interval can include monthly tasks.

* * * * *